United States Patent
Hill et al.

(10) Patent No.: US 9,076,231 B1
(45) Date of Patent: Jul. 7, 2015

(54) TECHNIQUES FOR DISPLAYING CONTENT ON A DISPLAY TO REDUCE SCREENSHOT QUALITY

(71) Applicants: Charles Hill, Issaquah, WA (US); Joseph Acklin, Carmel, IN (US)

(72) Inventors: Charles Hill, Issaquah, WA (US); Joseph Acklin, Carmel, IN (US)

(*) Notice: Subject to any disclaimer, the term of this patent is extended or adjusted under 35 U.S.C. 154(b) by 0 days.

(21) Appl. No.: 14/527,634

(22) Filed: Oct. 29, 2014

Related U.S. Application Data

(60) Provisional application No. 61/941,061, filed on Feb. 18, 2014.

(51) Int. Cl.
 *G09G 5/00* (2006.01)
 *G06T 3/40* (2006.01)

(52) U.S. Cl.
 CPC ............ *G06T 3/4023* (2013.01); *G06T 3/4092* (2013.01)

(58) Field of Classification Search
 None
 See application file for complete search history.

(56) References Cited

U.S. PATENT DOCUMENTS

| | | | |
|---|---|---|---|
| 7,689,926 B2 | 3/2010 | de Souza | |
| 7,966,376 B2 | 6/2011 | Kelso | |
| 8,429,745 B1 | 4/2013 | Casaburi | |
| 2006/0103732 A1* | 5/2006 | Bateman | 348/208.2 |
| 2008/0196046 A1* | 8/2008 | Athas et al. | 719/320 |
| 2010/0205667 A1* | 8/2010 | Anderson et al. | 726/19 |
| 2012/0169762 A1* | 7/2012 | Kocjan et al. | 345/619 |
| 2012/0255029 A1 | 10/2012 | Kim | |
| 2013/0060603 A1* | 3/2013 | Wagner | 705/7.29 |
| 2013/0290443 A1 | 10/2013 | Collins | |
| 2014/0177734 A1* | 6/2014 | Carmel et al. | 375/240.26 |

FOREIGN PATENT DOCUMENTS

| | | |
|---|---|---|
| CN | 102004878 A | 4/2011 |
| CN | 103246831 A | 8/2013 |
| CN | 103685735 A | 3/2014 |

OTHER PUBLICATIONS

TheRykerDane, "iDelete App First Look!!! New From the App Store for iPhone 3 4 5," YouTube.com, Mar. 18, 2013, <http://www.youtube.com/watch?v=Za78EMGpOtU> [retreived Mar. 30, 2015], 2 pages.

Parparita, M., "Screenshot-Proof Images Via Temporal Dithering," <http://persistent.info/web-experiments/temporal-dithering/> [retreived Mar. 30, 2015], 2 pages.

* cited by examiner

*Primary Examiner* — Mark Zimmerman
*Assistant Examiner* — Michelle Chin
(74) *Attorney, Agent, or Firm* — Davis Wright Tremaine LLP

(57) ABSTRACT

Techniques for displaying content on a display to reduce screenshot quality are described herein comprising generating a set of degradation frames based on a source frame, with each degradation frame in the set of degradation frames based on applying one or more alterations to the data in the source frame based on a set of degradation parameters. A frame display order is determined and at least a subset of the degradation frames is displayed, corresponding to the frame display order.

26 Claims, 13 Drawing Sheets

TECHNIQUES FOR DISPLAYING CONTENT ON A DISPLAY TO REDUCE SCREENSHOT QUALITY

CROSS-REFERENCE TO RELATED APPLICATIONS

This application claims priority to U.S. Provisional Patent Application Ser. No. 61/941,061, filed Feb. 18, 2014 and entitled TECHNIQUES FOR DISPLAYING CONTENT ON A DISPLAY TO REDUCE SCREENSHOT QUALITY, which is incorporated by reference herein in its entirety.

BACKGROUND

Modern computing devices include functionality to create high-quality screen captures or screenshots of the state of the display of the device. Mobile devices typically are configured with functionality to create screen captures with such functionality built into the operating system running thereon. Such mobile devices also typically have high-quality cameras that can create screen captures of other devices such as personal computers, laptops, consoles, or other such devices. Screen captures may allow the capture of sensitive, secure, or important data and, as such screen captures may typically be sent to other devices, such screen captures may allow the sharing of such important data, thereby reducing the security of the data.

BRIEF SUMMARY

Embodiments described in the present disclosure provide methods, systems, and processes for displaying the content on a display such that the quality of screenshots (also referred to herein as screen shots, screen captures, screen dumps, screen caps, screen grabs, and screen scraps) and the quality of external device image captures is reduced.

The following detailed description together with the accompanying drawings will provide a better understanding of the nature and advantages of the embodiments described in the present disclosure.

BRIEF DESCRIPTION OF THE FIGURES

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the displaying content on a display to reduce the quality of screenshot (also referred to herein as a screen shot, screen capture, screen dump, screen cap, and screen grab) and/or an external device image capture. The techniques described herein may, for instance, prevent the capture of an image containing all of the characters in a message or pixels in an image in a clear way, hence, making the message or image delivered more private and secure from duplication. As used herein, the term "image" may be understood to refer to a bitmap and/or an image representation with one or more pixel elements. An image may contain text elements but unless specified or made clear from context, an image (and "image content") may be considered as distinct from text (and "text content"). Many operating systems and applications executing thereon provide the opportunity for users to capture screenshots, which are images of a state of a visual display of or otherwise associated with a computing device or to take pictures of screens using external devices. Techniques of the present disclosure allow for the ability to prevent high-quality screenshots and/or other reproductions of on-screen content, thereby increasing the privacy of those associated with text and/or images.

For example, a user may have a photograph stored on a mobile device that he or she wishes to remain secure. Such a photograph may be denoted as private so that, when it is displayed using the mobile device, it is displayed using the degradation techniques described herein. Any screenshot of the display, including a screenshot taken from an external device, may only display a portion (or part) of the photograph clearly in each frame, with the rest of the photograph degraded. The photograph may display clearly due to psychophysical properties of vision (e.g., persistence of vision) but any screenshot would only capture a single degraded image, thus rendering the screenshot in a secure manner. Similarly a user may have text content that he or she wishes to remain secure. Such text content may be displayed using the degradation techniques described herein where only a portion of the text is displayed during each frame but the whole is legible due to the psychophysical properties of vision. A screenshot of the display may only display a portion of the text, with the rest of the text remaining obscured or hidden, thus rendering the text unreadable or unintelligible in the screenshot.

Figure 1:
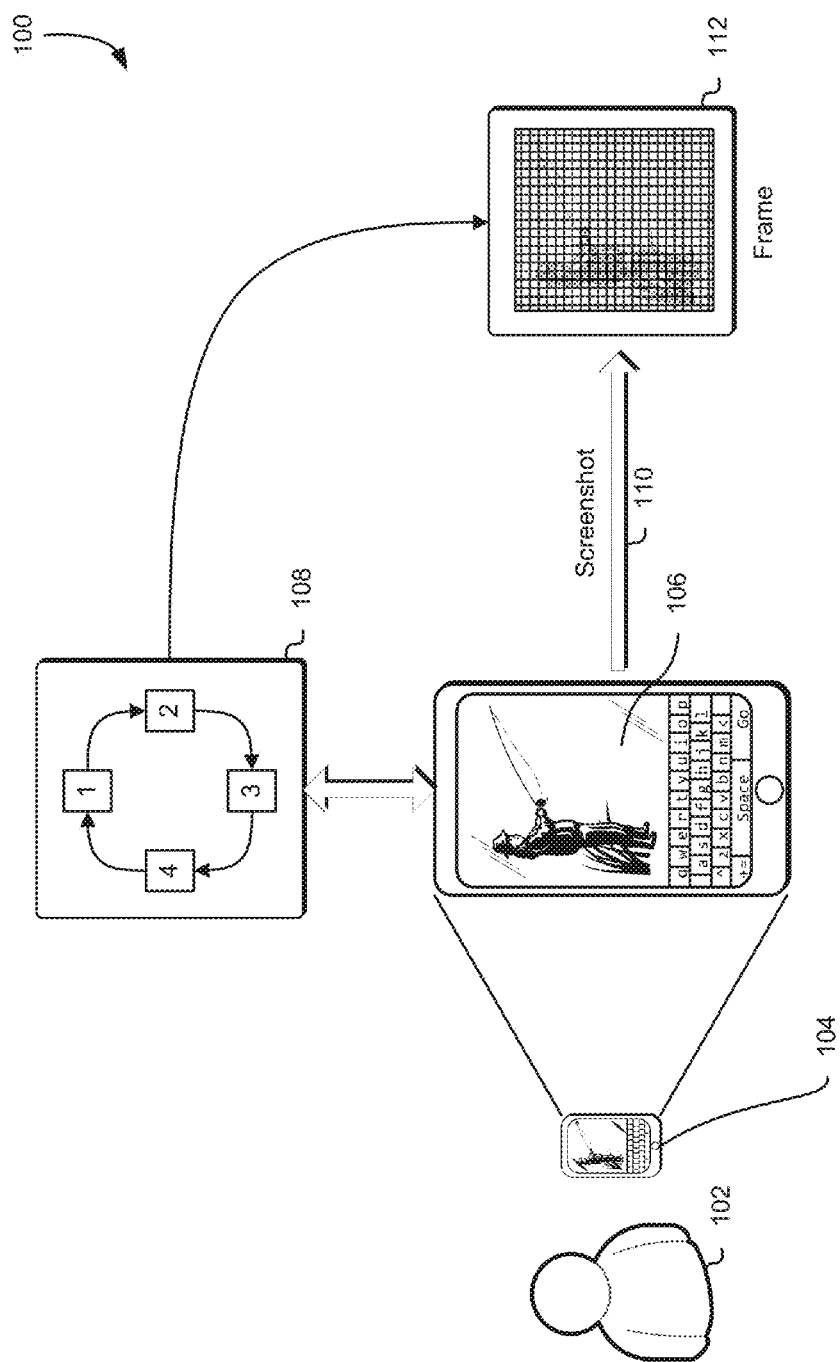
FIG. 1 illustrates an example environment where an image may be degraded in accordance with an embodiment.

FIG. 1 illustrates an example environment 100 where a screen image may be degraded (also referred to herein as a "degraded image representation") using techniques for displaying content on a display to reduce screenshot quality in accordance with an embodiment. A user 102 may use a computing device 104 that may be configured to degrade screenshots associated with the device. The computing device 104 may be configured with a display 106 configured to display graphics, text, or other such user interface elements that may be used in connection with the operation of the computing device. In the example illustrated in FIG. 1, the computing device 104 may include a display 106 that may be integrated into the device although, as noted, a display 106 may also be external to a computing device that implements techniques for degrading screenshots described herein. While the examples illustrated herein show a mobile device, the techniques described herein are applicable to other computing devices such as desktop computers, notebook computers, tablet computers, smart devices (such as smart watches) and, generally, any computing devices that have an integrated display and/or that are operable to cause images to appear on another display or be projected onto another surface.

In this example, the display 106 shows an image which is an image of a woman fishing. In some embodiments, the device display area (and/or components thereof, such as images and/or characters) may be presented in a manner that takes advantage of the psychophysics of vision and the way vision is processed by humans and, in particular, the fact that, if an area of that displayed content is visible for a short period of time, the brain cannot detect that anything is missing. In other words, the brain fills in information that is missing from an image for a short period of time. Accordingly, techniques described herein take advantage of the psychophysics of vision to deliver visible content (e.g., images and/or text) while reducing the quality of individual frames and/or screen captures of the displayed content.

In the example illustrated in FIG. 1, the display 106 is configured to display four cyclic images 108 on the display. The cyclic images, which may also be referred to herein as "degradation frames" or more simply as "frames" each contain degradation frame content which may include degraded content (i.e., content altered according to the techniques described herein) and non-degraded content (i.e., content not altered). The degraded content (also referred to herein as "degraded data") may be altered using one or more degradation parameters described herein. The non-degraded content (also referred to herein as "non-degraded data") may be copied from the source frame (i.e., the original data) with no alterations. Each of the four cyclic images 108 may be displayed for a period of time and each of the four cyclic images 108 may include only a portion of the image from the display 106. For example, the image of the woman fishing may be configured as a 256 pixel by 256 pixel image. In an example, the first of the four cyclic images 108 may include a first one-fourth (¼ or 25%) of the pixels clearly displayed with the other three-fourths (¾ or 75%) of the pixels blurred, removed, erased, altered, or otherwise obscured. The first of the four cyclic images 108 may clearly display every fourth pixel (i.e., the first, the fifth, the ninth, etc.), or may clearly display some other distribution of a subset of the pixels (i.e., a random subset of the pixels). The first of the four cyclic images 108 may also clearly display more than or less than one-fourth of the pixels of the image. In an embodiment, the portion of the image selected from the source image may be a randomly selected portion.

In an embodiment, the set of pixels (also referred to herein as an "image element" or "image elements") in each of the four cyclic images 108 may be selected based in part on one or more properties of vision and/or may be based on one or more properties of the image displayed. In an embodiment, the image elements may random image elements, which may be randomly selected from the image. For example, an image may include an uneven distribution of light and dark colored pixels and the set of clearly displayed pixels in each of the four cyclic images 108 may be selected to preserve that uneven distribution. Similarly, an image may specify one or more regions of interest, and the set of clearly displayed pixels in each of the four cyclic images 108 may be selected to obscure those one or more regions of interest by distributing the pixels corresponding to those one or more regions of interest across multiple images in the four cyclic images 108.

In the example illustrated in FIG. 1, the second of the four cyclic images 108 may include a second one-fourth of the pixels clearly displayed with the other three-fourths of the pixels blurred, removed, erased, altered, or otherwise obscured. In an embodiment, the set of pixels that are clear in the first of the four cyclic images 108 may be disjoint (i.e., may include no overlapping elements in common) with the set of pixels that are clear in the second of the four cyclic images 108. In another embodiment, the set of pixels that are clear in the first of the four cyclic images 108 may be partially disjoint (i.e., include some overlap) with the set of pixels that are clear in the second of the four cyclic images 108. In the example illustrated in FIG. 1, the third and fourth of the four cyclic images 108 may each include a similar one-fourth of the pixels clearly displayed with the other three-fourths of the pixels obscured and/or may include similar overlapping and/or non-overlapping sets of clearly displayed pixels.

The images in the four cyclic images 108 may be displayed in sequential order (i.e., first, second, third, etc.), random order, stochastic order (i.e., having a random probability distribution), an order based on psychophysics, an acyclic order (i.e., an order than does not repeat from iteration to iteration), or in some other such order. In the example illustrated in FIG. 1, a screenshot 110 taken from the device 104 may result in a single frame 112 selected from whichever of the four cyclic images 108 may be currently displayed. The single frame 112 may be the first of the four cyclic images 108, or may be the second of the four cyclic images 108, or may be the third of the four cyclic images 108, or may be the fourth of the four cyclic images 108. Each of the four cyclic images 108 in the example only includes one-fourth of the pixels of the image clearly displayed, with three-fourths of the pixels obscured, thus mostly obscuring the image in the frame 112. As may be contemplated, the number (e.g., four) of frames in the four cyclic images 108 described herein is merely an illustrative example and other examples with more or less frames (e.g., two, three, or more than four) may be considered as within the scope of the present disclosure. Further, while each frame having the same percentage of unobscured (or clear) pixels is used for the purpose of illustration, the amount of unobscured pixels in each frame may vary in some embodiments. For instance, one frame may have 25% unobscured pixels and another frame may have 33% unobscured pixels.

The techniques described herein may be used to degrade the appearance of screenshots that may be obtained from a computing device. The techniques described herein further may be tuned in accordance with human capabilities. For example, the techniques described above may be tuned so that units of display of content appear more often or less often depending on desired fidelity of appearance of the display to a human user relative to the appearance of the display to a human user if the content was displayed statically. In some embodiments, the frames change as fast as display hardware is able to update the display, although the frames may change at a rate that is slower than the display is able to refresh. In some embodiments, the frame change rate is constant while in other embodiments the frame change rate varies over time. For example, if a device is configured to detect a human retina, the frame change rate may be faster when a retina is detected and slower when a retina is not detected to conserve power and to make the image more difficult to capture with an external camera or other capture device when a human is not detected to be looking at the display. Similarly, the device can be monitoring other systems and/or sensors within the device, such as the accelerometer, gyroscope, and/or button pushes on the device and any and all other possible sensors, to determine if an attempt is being made to take a screen capture or capture an image with an external device in which case the frame rate may change or the image may not be presented at all in order to make the image more difficult to capture with an external camera or other capture device. Generally, the techniques of the present disclosure extend to numerous variations of techniques of determining regardless of whether an attempt to capture screen content is made.

Other variations of the present disclosure relate to how screen content is modified. For example, in some embodiments, different portions of a display 106 may be modified at different rates and/or in different ways. Content comprising both image content and alphanumeric content may, for example, utilize such variations such that a first technique is used for the image content while another technique is used for the alphanumeric content. Other such techniques for modifying screen content are described herein.

While modular arithmetic and other techniques for dividing content into frames (e.g., the four cyclic images 108) are discussed herein explicitly for the purpose of illustration, other techniques are also considered as being within the scope of the present disclosure such as, but not limited to, using a random number generator or other stochastic process to determine which pixels or characters would be modified. For example, the above description relates to embodiments where content is allocated among a plurality of frames that are each displayed at different times in a cyclical manner. The order in which frames are displayed may be acyclic (i.e., in a varying order from iteration to iteration that presents every frame in every iteration), in some embodiments. Further, in some embodiments, the contents of the frames themselves are not deterministically selected. For example, in some embodiments, each successive frame may be stochastically determined such that, at any given moment, each pixel, group of pixels, character, and/or group of characters may have a probability of being displayed (or, equivalently, each pixel, group of pixels, character, and/or group of characters has a may have a probability of being hidden). The probabilities may be configured so that the expected amount of time a unit of display (pixel, group of pixels, character, and/or group of characters) is displayed is sufficient for desired appearance to a human user and may be based in part on one or more psychophysical properties of vision. In this manner, frames may not repeat cyclically.

In addition, enforcement of the techniques may be achieved in various ways in accordance with various embodiments. In some embodiments, the content may be transmitted from one user to another over a network or a combination of networks, such as the Internet and/or mobile communication networks. Users who communicate with each other may utilize instances of a mobile application that may cause their respective devices to utilize the techniques described herein. For example, a user may receive content from another user and the receiving device may be configured to determine which frames to show successively upon receipt of the content. In other embodiments, a user's device may be configured to determine the frames and transmits the frames to the other user's (or users') device(s) as described herein. In some examples, for instance, each frame may be transmitted in a different Internet Protocol (IP) packet, although multiple frames may be transmitted in a single IP packet. In yet other examples, the content may be allocated among frames and further reallocated by a device that receives the frames (i.e., further allocated to form additional frames). It should be noted that the term "frame" is to be interpreted broadly and may include allocation of content into pieces, whether by forming individual images (e.g., to form an animation) or otherwise, such as by dividing textual content into multiple partitions.

Generally, the techniques of the present disclosure may include embodiments where a device transmitting content determines how a receiving device displays the content, embodiments where the receiving device determines how to display the content, embodiments where both the transmitting and receiving devices play a role in determining how content is displayed, and/or embodiments where a server or other device between a transmitting and receiving device plays a complete or partial role determining how content is to be displayed. Any device in the network path between and including a transmitting and receiving device may determine one or more variables related to the manner in which content is to be displayed, such as a refresh rate and/or parameters for how to divide content among frames. Other techniques may also be used to enhance the techniques described above. For instance, in some embodiments, additional information is added to a display in some or all frames so that, in a screenshot, the additional information obscures the image and/or text. The information may be minimal and infrequent enough to be undetectable by a human or at least minimally detectable so as to not destroy the ability of the user to understand the original content. The information may be in the form of additional pixels and/or alphanumeric characters.

Various sensors of a mobile and/or other such device may be used in various embodiments. For example, a camera of a mobile or other device may be used conjunction with facial recognition software (e.g., programming modules that provide the device the ability to detect faces in images). Such a device may be configured to ensure that a face is present before the image and/or text is degraded in accordance with the techniques described herein. The device may monitor for faces and cease presenting content, reduce a frame change rate, blur the image, or otherwise alter the display when a face is not detected. In this manner, many instances of users attempting to photograph the display of a device using another device may result in poor quality reproductions of on-screen content.

Similarly, other object detection techniques may be used such that, if sufficient processing capabilities are present, a device may similarly alter the display when a mobile device, digital camera, or other image capturing device is detected. Other enhancements may also be considered as being within the scope of the present disclosure. Other device sensors including, but not limited to, an accelerometer or a gyroscope, may be monitored to determine if user actions are indicative of an intent to capture a screenshot are present. For example, the pressing of multiple buttons that queues an operating system to take a screen capture, may be monitored. By monitoring the sensors of the device, it may be determined that a user is attempting to take a screen capture and the device may be configured to take mitigating action to prevent the screen capture. Examples of such mitigating action may include, but may not be limited to, mitigating action utilizing the techniques described herein. For example, upon detection of user input indicative of a screenshot, the device may cease presenting content, change frame rates, blur content, and/or otherwise alter the display. Such techniques may also be used in connection with techniques for determining whether a face is detected as described herein.

Figure 2:
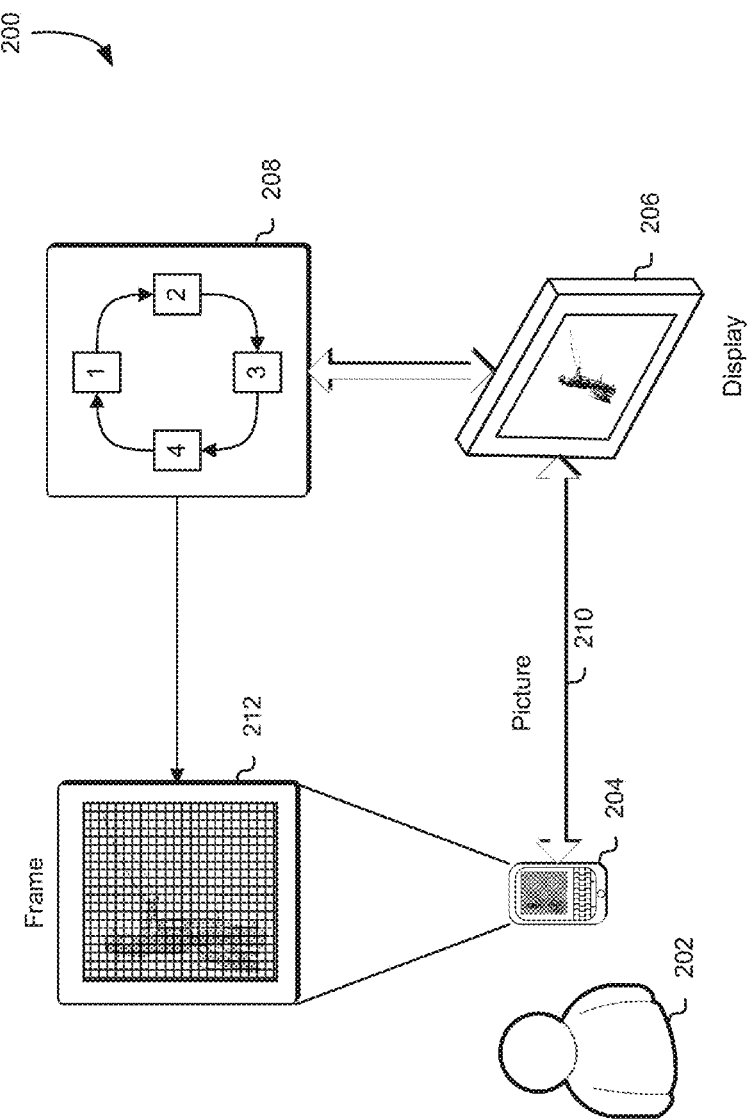
FIG. 2 illustrates an example environment where an image from a first device may be degraded before capture on a second device in accordance with an embodiment.

FIG. 2 illustrates an example environment 200 where a screen image of a device may be degraded using techniques for displaying content on a display to reduce screenshot quality of screenshots taken from a second device in accordance with an embodiment. A display 206 may be displaying an image using four cyclic images 208 using the techniques described herein in connection with FIG. 1. The image displayed and/or the four cyclic images 208 may be generated by a computer system device such as a workstation, a desktop computer, an image generator, a server, or some other such computer system device. The computer system device may be directly attached to and/or incorporated with the display 206. The computer system device may also generate the image and/or the four cyclic images 208 and provide them to the display 206 using a network connection using a wireless and/or a wired connection. The computer system device may be locally connected to the display 206, remotely connected to the display 206, or may be connected using a combination of such methods.

A user 202, with a computing device 204 may take a picture 210 of the display 206 using a camera and/or some other such image capture functionality associated with the computing device 204. For example, the computing device 204 may be a mobile device with a camera, and the user may point the camera at the display 206 to take the picture 210. In the example illustrated in FIG. 2, the picture 210 taken by the computing device 204 may only capture one of the four cyclic images as a frame 212. The frame 212 may only clearly present one-fourth of the pixels in the image, with the other three-fourths of the pixels obscured as described herein in connection with FIG. 1.

Figure 3:
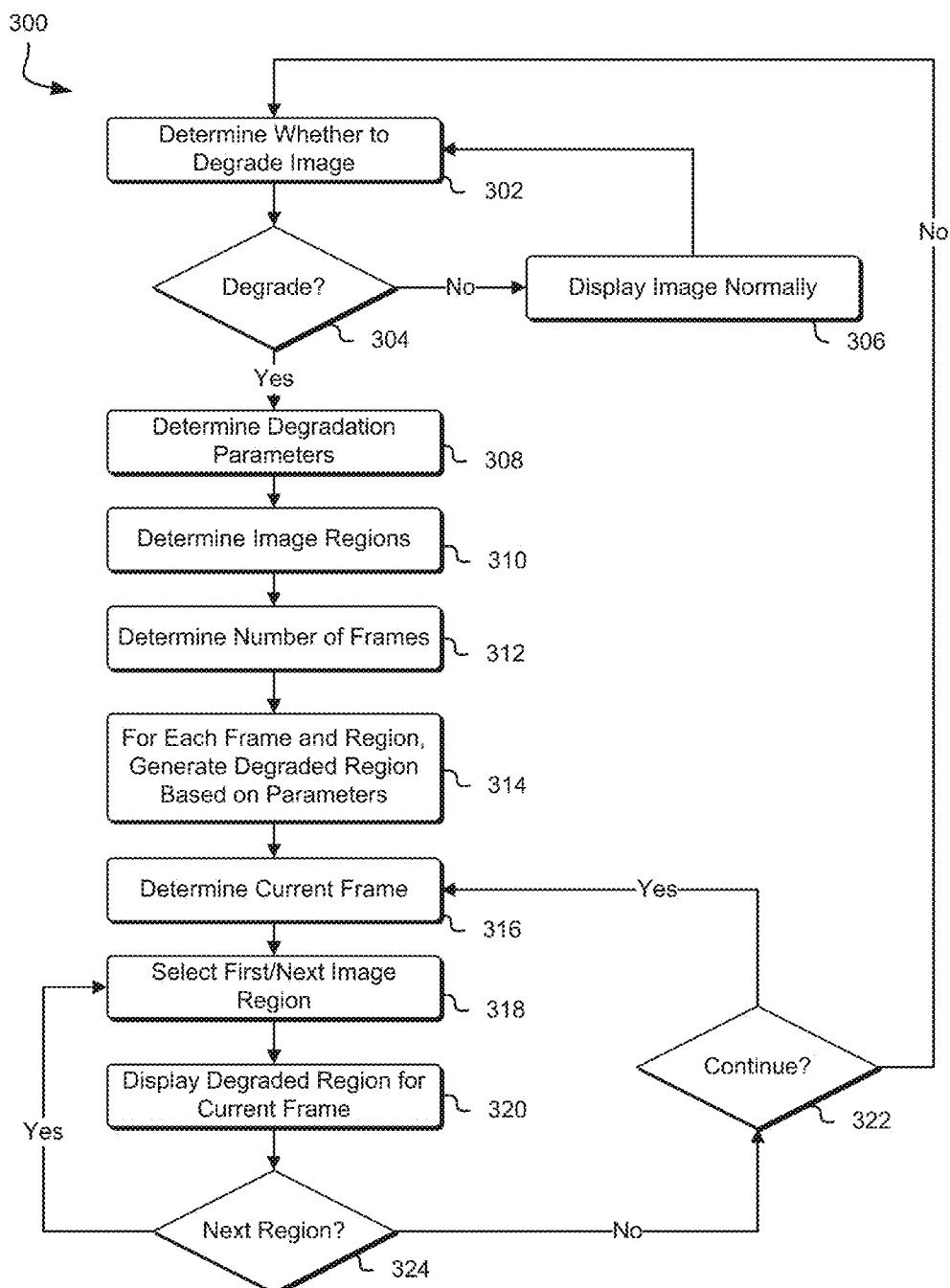
FIG. 3 illustrates an example process for generating degraded image frames in accordance with an embodiment.

FIG. 3 illustrates an example process 300 for generating degraded frames based at least in part on the image content of the frame as described in connection with FIG. 1 and in accordance with an embodiment. The process illustrated in FIG. 3 may be performed by a computing device such as the computing device 104 described in connection with FIG. 1. The process illustrated in FIG. 3 may also be performed by a computing device such as the computing device described in connection with the display 206, described in connection with FIG. 2.

The computing device that is configured to perform the process 300 may first determine whether an image should be degraded 302. For example, the image may only be degraded 302 when a user is attempting to take a screenshot of the displayed image, or may be degraded whenever certain sensitive content is displayed, or may be degraded when a user enables the feature, or may be degraded according to some other conditions. If it is determined not to degrade 304 the image, the computing device that is configured to perform the process 300 may instead display the image normally 306 (i.e., not degraded).

If it is determined to degrade 304 the image, degradation parameters may first be determined 308. Examples of degradation parameters may include determining how many cyclic images may be used to degrade the image, the display order of the cyclic images, the perturbations of the order of the cyclic images (cyclic, acyclic, random, using modular mathematics, etc.), how clear pixels are distributed between the images, how pixels are obscured, or combinations of these and/or other such degradation parameters. One or more of the degradation parameters may be based on random and/or stochastic processes. One or more of the degradation parameters may also be based on psychological aspects of vision. One or more of the degradation parameters may also be based on the content of the image.

In addition to determining the degradation parameters, the computing device that is configured to perform the process 300 may next determine which image regions may be degraded 310. In some embodiments, the process 300 may be configured to degrade the entire image, or may be configured to degrade only a portion of the image. In an embodiment, the process 300 may be configured to apply different degradation parameters to different regions of an image. For example, one region of an image may have more stringent degradation parameters applied to it than another region of the image. The determination of the degradation parameters may also include a determination of the number of frames 312 (or a number of cyclic images) to be used for the degradation. The process 300 may next be configured to generate degraded images for each frame and for each region 314, based on the degradation parameters. In embodiments where only a portion of an image is degraded, the portion may be determined in various ways in accordance with various embodiments. For instance, in some embodiments, an application executing on the computing device may allow a user to use an input device (e.g., a touchscreen) to form rectangle, draw a region (e.g., by freeform drawing of the region), or otherwise select the region.

The process 300 may then be configured to display the degraded images by first determining the current frame 316 (i.e., the frame to display, based on display parameters of the device) and the proper image region 318 and then displaying the region for that frame 320 while there are regions 324 and frames 322 to display. In an embodiment, the process 300 may be configured to continue displaying the regions and frames until the process is terminated. In an embodiment, the process 300 may, after displaying all regions and frames, determine whether to continue degrading the image.

Figure 4:
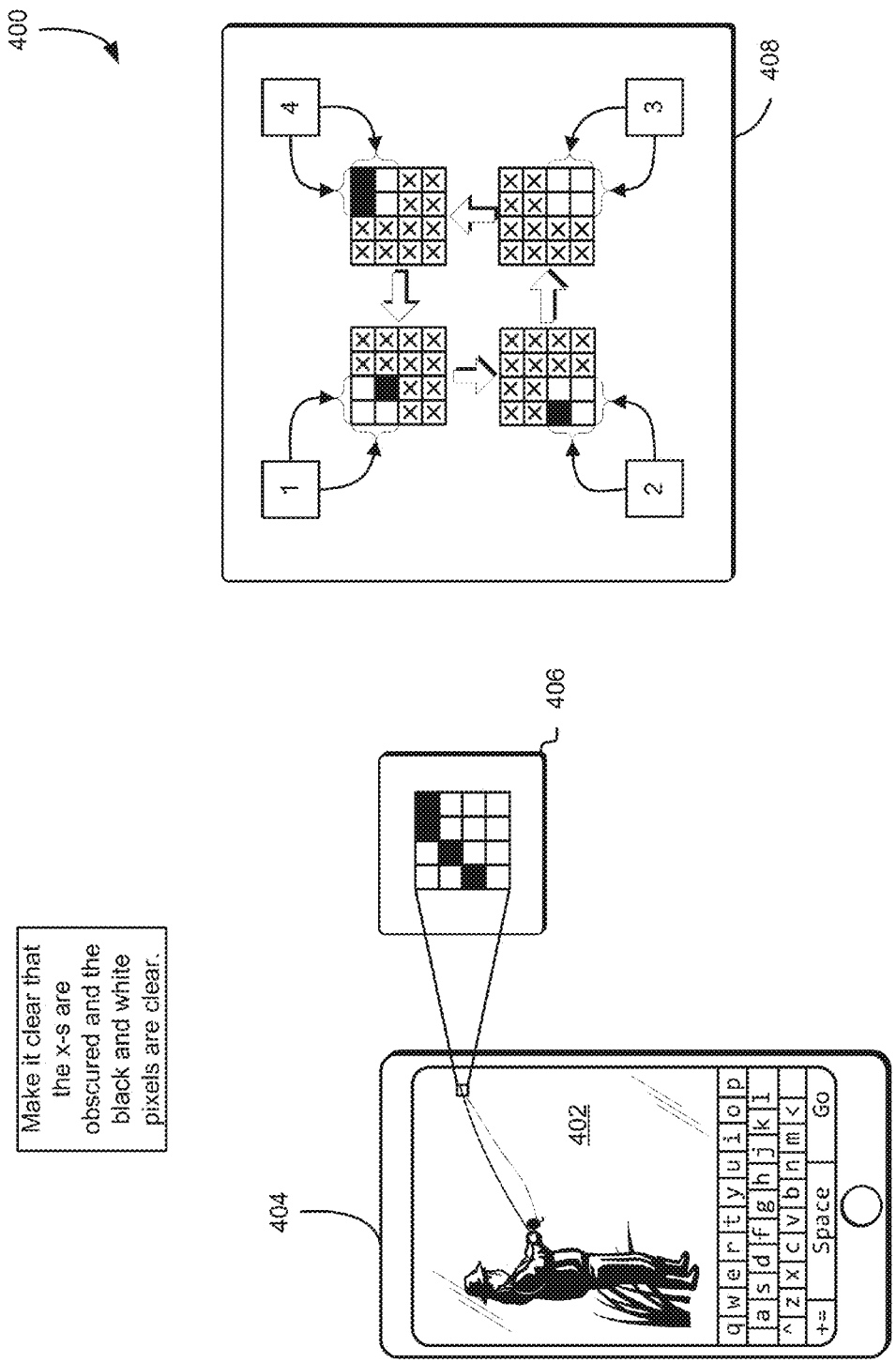
FIG. 4 illustrates an example environment where degraded image frames are generated in accordance with an embodiment.

FIG. 4 illustrates an example environment 400 showing the details of one method of generating degraded frames based at least in part on the image content of the frame as described in connection with FIG. 3 and in accordance with an embodiment. A display 402 on a device 404 is shown with a close-up view 406 of a four-by-four region of pixels of the image. The cyclic images 408 show one method of degrading the pixels of the close-up view. In the first of the cyclic images 408, the four upper left pixels are displayed clearly and the other twelve pixels are obscured (as denoted by the "x" in the pixel). The other twelve pixels may be obscured by blurring the contents of each of the three two-by-two regions. In an embodiment, a pixel region may be blurred by, for example, reducing the pixels down to a smaller region using subsampling and then expanding the smaller region back to the original region size. In such an embodiment, a region may contain four pixels in a two-by-two region with single color values of zero, sixty-four, sixty-four, and one-hundred and ninety-two (0, 64, 64, 192). Subsampling may reduce the two-by-two region to a single pixel with a color value of eighty (i.e., the average value of the four color values). Expanding would then restore the region to four pixels in a two-by-two region, but with all four of the pixels having a color value of eighty. As may be contemplated the method of blurring the pixels described herein is an illustrative example and other such methods of blurring pixels may be considered as within the scope of the present disclosure.

In the second of the cyclic images 408, the four lower left pixels are displayed clearly and the other twelve pixels are obscured. In the third of the cyclic images 408, the four lower right pixels are displayed clearly and the other twelve pixels are obscured. In the fourth of the cyclic images 408, the four upper right pixels are displayed clearly and the other twelve pixels are obscured. As may be contemplated, the divisions of the clearly displayed pixels and/or the obscured pixels illustrated in FIG. 4 and described herein are merely illustrative examples and other such divisions of clearly displayed pixels and/or obscured pixels may be considered as within the scope of the present disclosure. For example, the pixels may be clearly displayed and/or obscured by rows, by columns, randomly, or by some other such division.

Figure 5:
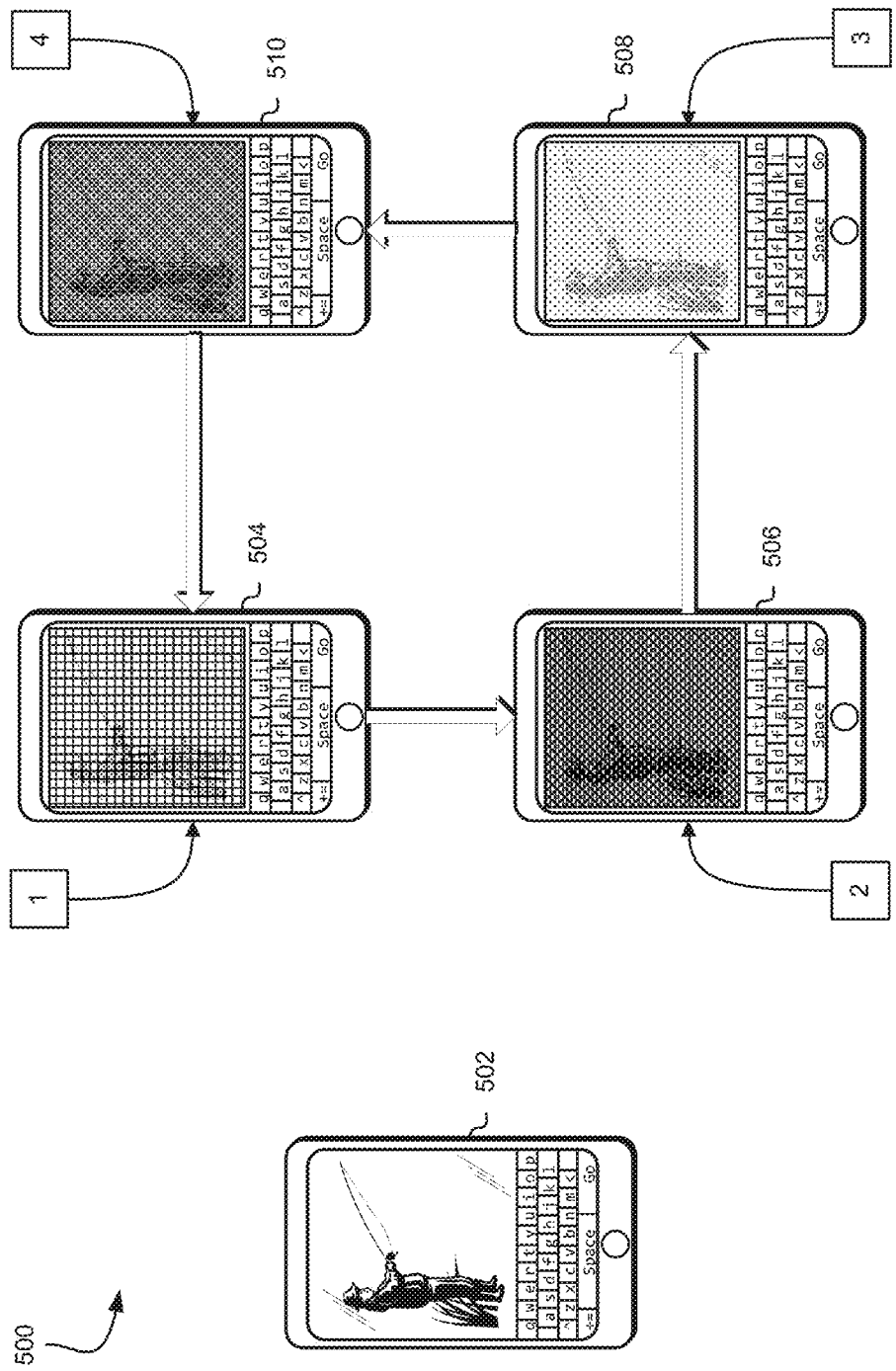
FIG. 5 illustrates an example environment where degraded image frames are used to generate a screen image in accordance with an embodiment.

FIG. 5 illustrates an example environment 500 where a display may be degraded as a result of applying the method of generating degraded frames based at least in part on the image content of the frame as described in connection with FIG. 3 and in accordance with an embodiment. The device 502 may display the image so that it appears to not be degraded to a user by displaying the first of the cyclic images 504, followed by the second of the cyclic images 506, followed by the third of the cyclic images 508, followed by the fourth of the cyclic images 510, and so on. Each of the displayed cyclic images may appear to be degraded to a user if displayed individually such as, for example, in a screenshot. However, by displaying the images rapidly enough, psychophysical properties of vision may allow the image to appear to not be degraded to the user.

Figure 6:
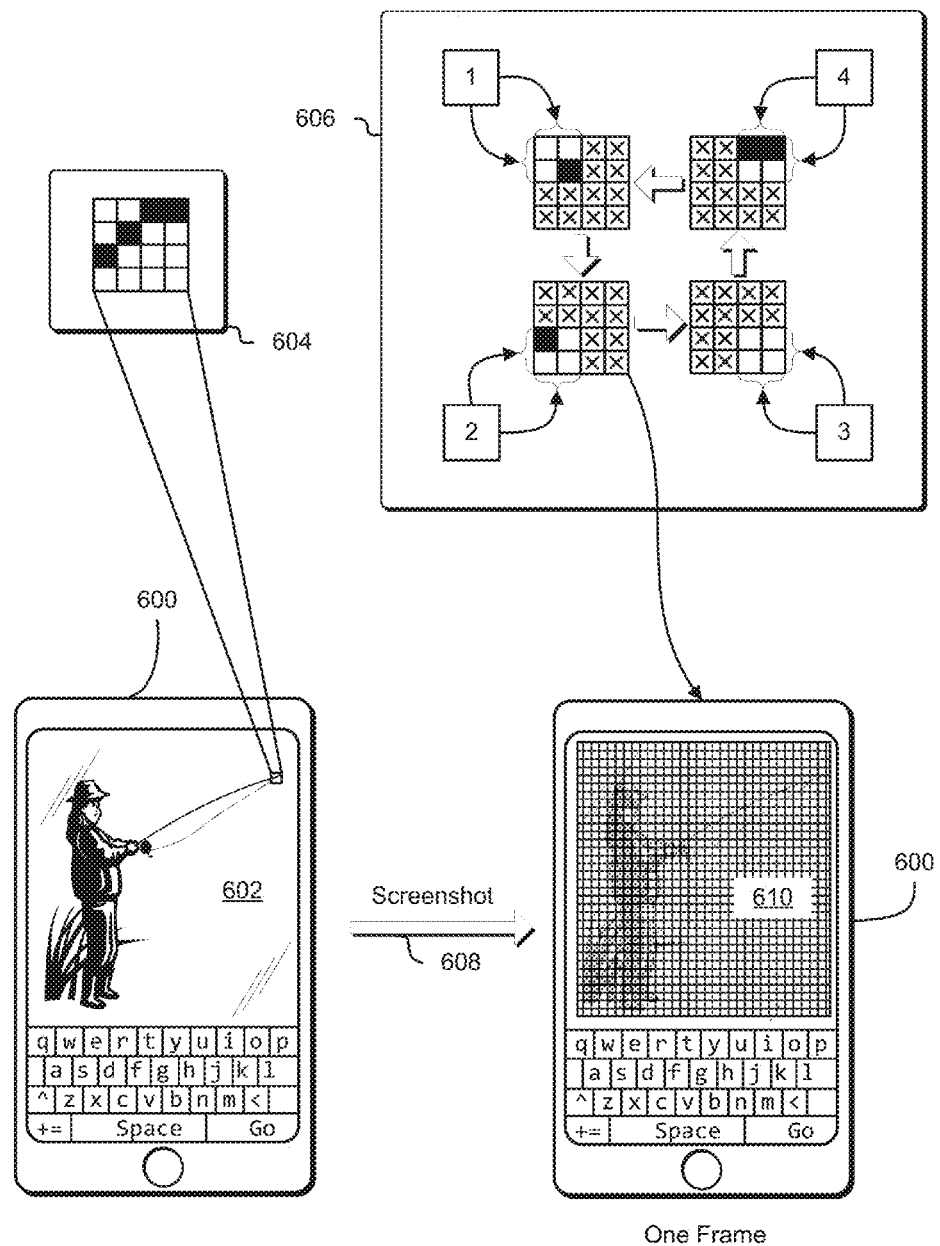
FIG. 6 illustrates an example mobile device that displays degraded image frames in accordance with an embodiment.

FIG. 6 shows an illustrative example of a mobile device 600 which may be used to implement various aspects of the present disclosure. Example components of the mobile device 600 are discussed below in connection with FIG. 13, although other configurations are considered as being within the scope of the present disclosure. As previously mentioned herein, while FIG. 6 shows a mobile device, the techniques described herein are applicable to other computing devices such as desktop computers, notebook computers, tablet computers, smart devices (such as smart watches) and, generally, any computing devices that have an integrated display and/or that are operable to cause images to appear on another display or be projected onto another surface. In the example of FIG. 6, the mobile device 600 includes a display 602 integrated into the device although, as noted, displays may be external to the device that implements techniques for preventing screenshots described herein.

In this example, the display 602 shows an image which is an image of a woman fishing. In some embodiments, the device display area (and/or components thereof, such as images and/or characters) is/are presented in a manner that takes advantage of the psychophysics of vision and the way vision is processed by humans and, in particular, the fact that, if an area of that displayed content is visible for a short period of time, the brain cannot detect that anything is missing. In other words, the brain fills in information that is missing from an image for a short period of time. Accordingly, techniques described herein take advantage of this to deliver visible content (e.g., images and/or text) while reducing the quality of screen captures of the content.

In an embodiment, content is broken down into pieces that are arranged into different frames that are displayed at different times. One of these pieces is shown in the close-up 604. A process executing on the mobile device 600 is configured such that, only pieces of the content are visible on the display at any one time as illustrated by the cyclic images 606 (which may be the same as those described herein in connection with FIGS. 4 and 5). The pieces of the content may be changed rapidly so as to, when perceived by a human viewing the content, make the appearance of the content being displayed all at once. If a screenshot is taken, only the portions of the content that were shown on the display of a device at that particular time are included in the screenshot.

As illustrated in FIG. 6, one technique for achieving this is illustrated relative to a square portion of the display 602. In this particular example, the square is divided into units, which may be individual pixels or groups of pixels (such as square collections of pixels). In an embodiment, the square of units is configured such that, over time, the area of the display corresponding to the square changes over time. Different units of the square are displayed at different times (e.g., by turning on and off and/or distorting corresponding pixel elements in the display 602) such that, for a given unit, the unit is on enough time to be humanly perceptible while being off and/or distorted for a portion of the time. Different units are on at different times so that, if a screenshot is taken, only those pixels that are on or distorted at the time of the screenshot appear in the screenshot. In some embodiments, executable instructions cause the device to split the image into small groups of pixels. The pixels are then changed so they do not have a resolution as high as the original content. These groups of pixels are then cycled on and off so that a frame is composed of some low resolution groups and some high resolution groups.

In this illustrative example, the square area of the display changes over time by way of a repetitive cycle of frames although, as discussed above, embodiments of the present disclosure may display frames acyclically (e.g., displaying different frames in the cycle in different orders at each iteration). The square area may have a number of states, each with a different combination of portions of the display turned on at a given time. The display 602 may be refreshed to cycle through the states fast enough so that a human viewing the display 602 is able to ascertain what is on the display and, in some embodiments, so that employment of changing states is undetectable. It should be noted that, while a square area of the display is shown for the purpose of illustration, a complete display or other region of the display (e.g., corresponding to a display of an application employing the techniques described herein) have a number of states (frames) that are cycled through in this manner.

As illustrated in FIG. 6, when a screenshot 608 is taken, the screenshot, when displayed 610, appears different than the display appeared to the human operator before the screenshot. In this example, the screenshot appears as a low-resolution image that, as a result of missing pixels or groups of pixels modified to lower resolutions than the original, lacks detail ascertainable to the human when the content is displayed by the application employing the techniques described above. As noted, the portions of the display turned on and off may be blocks of pixels of different sizes and shapes in accordance with various embodiments and, as a result, screenshots taken when different techniques are employed may appear differently. In the example illustrated in FIG. 6, the image corresponding to the second of the cyclic images 606 is displayed 610 as a result of taking the screenshot 608.

Figure 7:
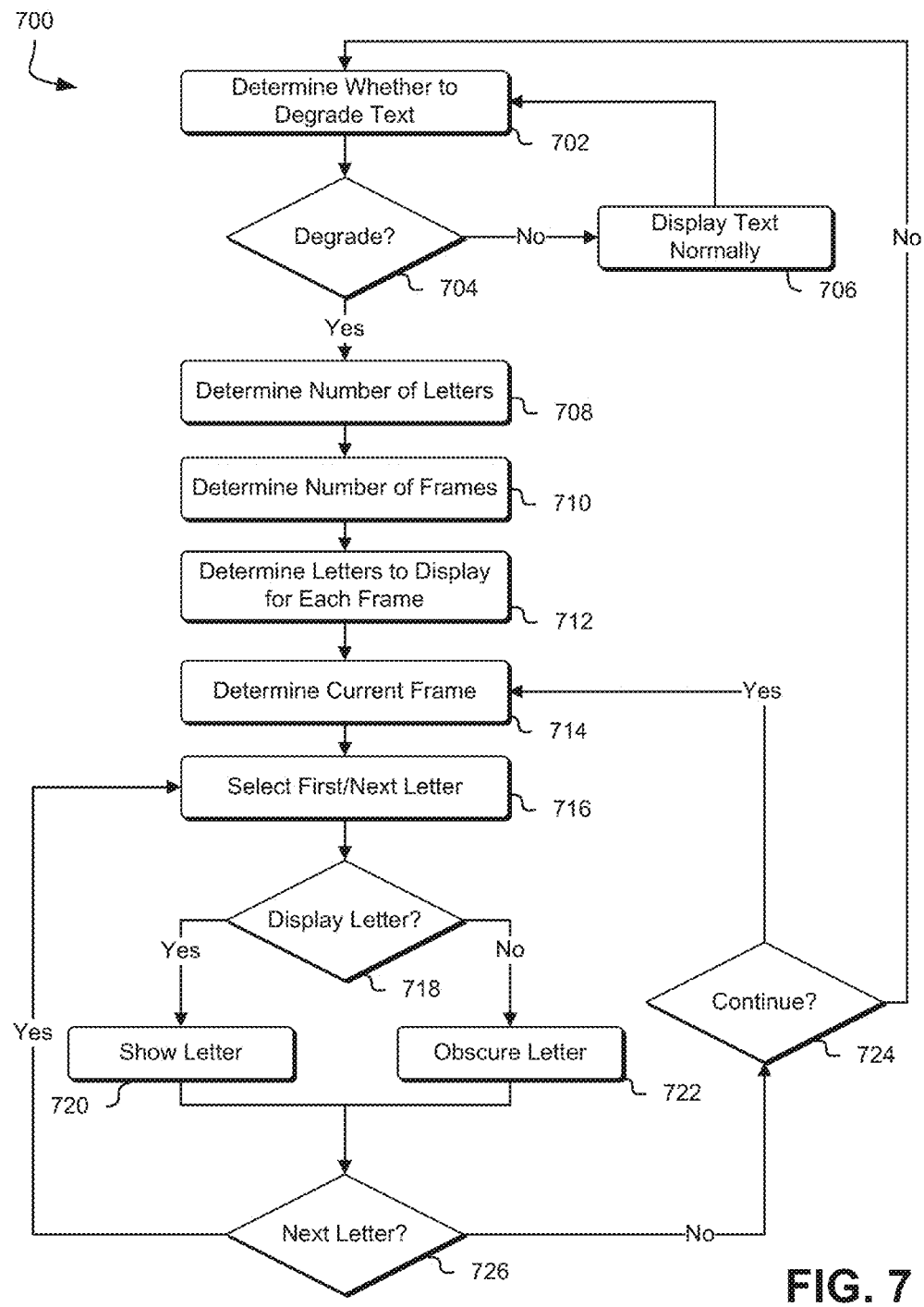
FIG. 7 illustrates an example process for generating degraded frames with text content in accordance with an embodiment.

FIG. 7 illustrates an example process 700 for generating degraded frames based at least in part on the text content of the frame as described in connection with FIG. 1 and in accordance with an embodiment. The process illustrated in FIG. 7 may be performed by a computing device such as the computing device 104 described in connection with FIG. 1. The process illustrated in FIG. 7 may also be performed by a computing device such as the computing device described in connection with the display 206, described in connection with FIG. 2.

The computing device that is configured to perform the process 700 may first determine whether text displayed on a display should be degraded 702. For example, the text may only be degraded 702 when a user is attempting to take a screenshot of certain text, or may be degraded whenever certain sensitive content is displayed (such as, for example, personal information), or may be degraded when a user enables the feature, or may be degraded according to some other conditions. If it is determined not to degrade 704 the text, the computing device that is configured to perform the process 700 may instead display the text normally 706 (i.e., not degraded).

If it is determined to degrade 704 the text, degradation parameters may first be determined including the number of letters 708 and/or the number of frames (i.e., the number of text perturbations) to use for degradation 710. Other degradation parameters may also be determined including, but not limited to, determining the display order of the text perturbations, variations of the order of the text perturbations (cyclic, acyclic, random, using modular mathematics, etc.), how clear text elements are distributed between the text perturbations, how letters are obscured, or combinations of these and/or other such degradation parameters. One or more of the degradation parameters may be based on random and/or stochastic processes. One or more of the degradation parameters may also be based on psychological aspects of vision. One or more of the degradation parameters may also be based on the content of the image.

In addition to determining the degradation parameters, the computing device that is configured to perform the process 700 may next determine which letters of the text may be displayed clearly in each frame 712. In some embodiments, the process 300 may be configured to degrade the entire text content, or may be configured to degrade only a portion of the text content. In an embodiment, the process 700 may be configured to apply different degradation parameters to different parts of the text. For example, one part of the text may have more stringent degradation parameters applied to it than another part of the text.

The process 700 may then be configured to display the degraded text by first determining the current frame 714 (i.e., the frame to display, based on display parameters of the device). The process 700 may next be configured to select the first letter 716 and may also determine whether to display the letter clearly 718. A letter that is not hidden may be displayed clearly 720. A letter that not displayed may be obscured 722 by hiding it. The process 700 may continue while there are letters 726 and frames 724 to display. In an embodiment, the process 700 may be configured to continue displaying the letters and frames until the process is terminated. In an embodiment, the process 700 may, after displaying all letters and frames, determine whether to continue degrading the text. In an embodiment, the process 700 may be used in concert with the process 300 illustrated herein in connection with FIG. 3 to degrade mixed mode (i.e., images mixed with text) content.

Figure 8:
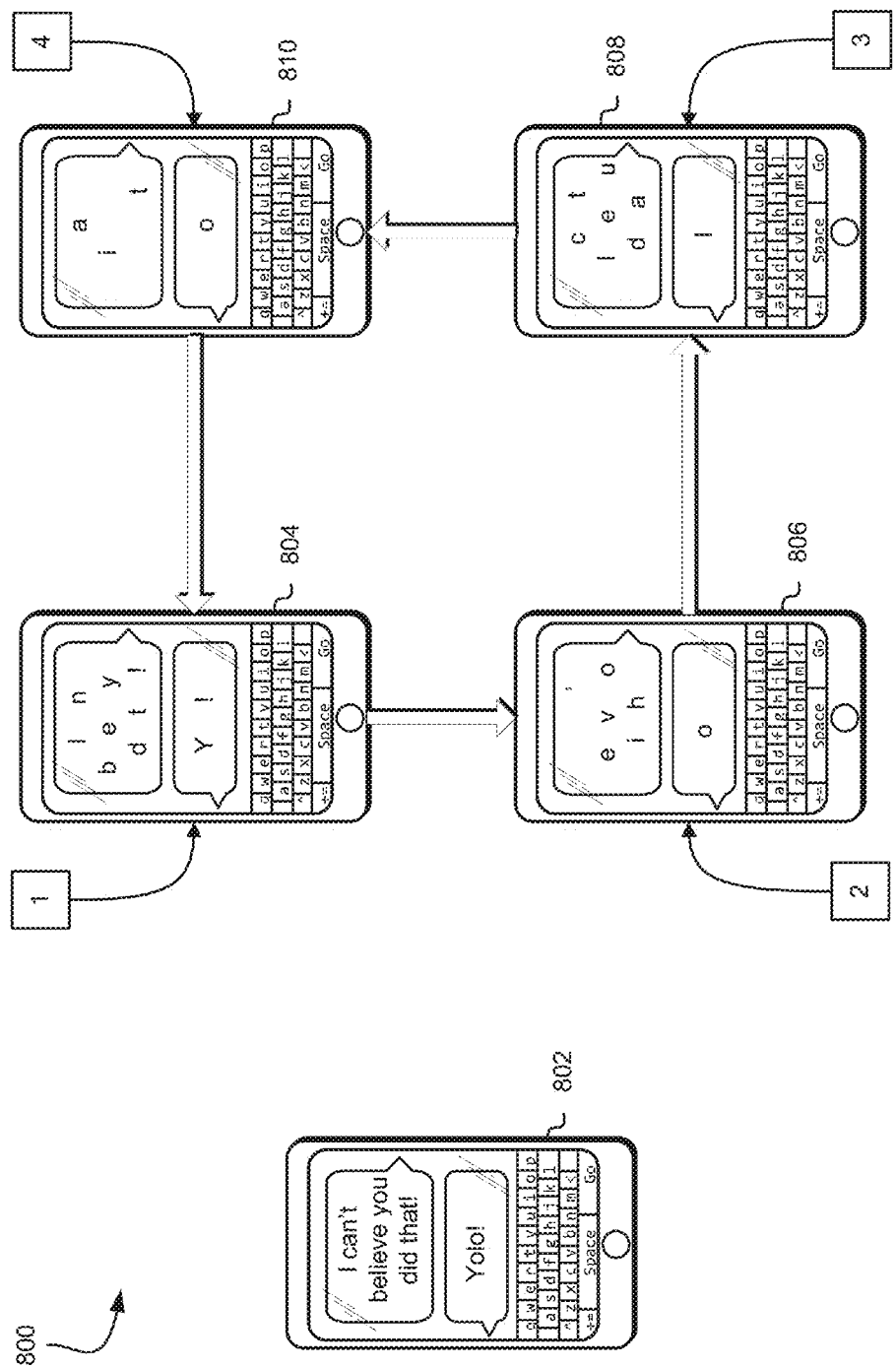
FIG. 8 illustrates an example environment where degraded frames with text content are used to generate a screen image in accordance with an embodiment.

FIG. 8 illustrates an example environment 800 where multiple degraded frames are generated for a single text item as described herein in connection with FIG. 7 and in accordance with an embodiment. The device 802 may display the text so that it appears to not be degraded to a user by displaying the first of the text perturbations 804, followed by the second of the text perturbations 806, followed by the third of the text perturbations 808, followed by the fourth of the text perturbations 810, and so on. Each of the displayed text perturbations may appear to be degraded to a user if displayed individually such as, for example, in a screenshot because of the missing 75% of the letters in each. However, by displaying the images rapidly enough, psychophysical properties of vision may allow the text to appear to not be degraded to the user. Text may be degraded or obscured by, for example, removing characters from the text, blurring individual characters, removing portions of characters, creating and/or obtaining an image representation of the text and using the techniques described herein to degrade the image representation, or by a combination of these and/or other such techniques. The image representation (or "bitmap") of the text may be created or obtained by creating a screenshot of the text, or by obtaining the image from the screen rendering of the text such as, for example, by inspecting the video memory of the device used to display the text.

Figure 9:
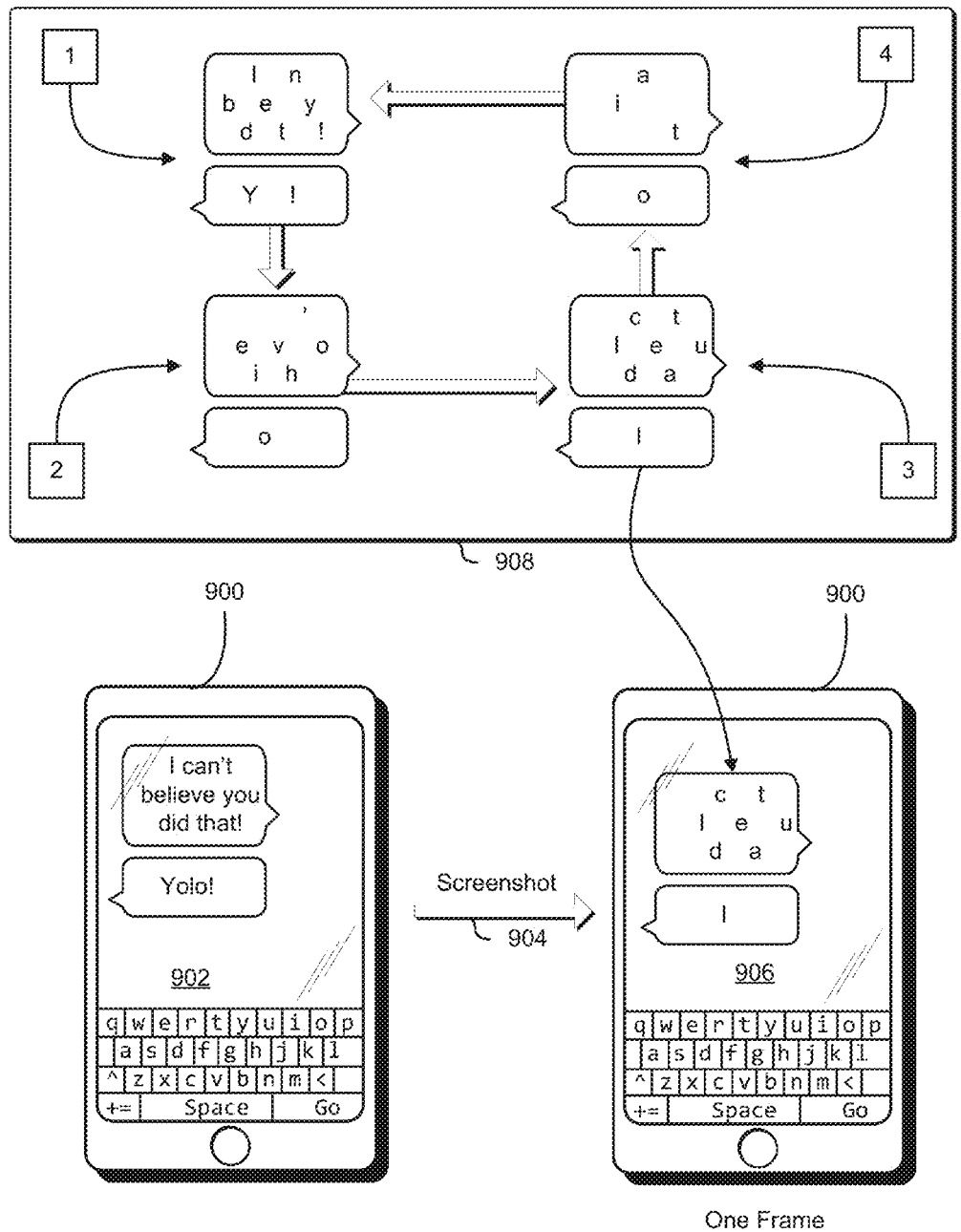
FIG. 9 illustrates an example mobile device that displays degraded frames with text content in accordance with an embodiment.

FIG. 9 illustrates an example mobile device 900 where multiple degraded frames are generated for a single text item as described herein in connection with FIG. 7 and in accordance with an embodiment. The mobile device 900 may be the mobile device 600 discussed above in connection with FIG. 6 and, similarly, other devices may utilize the techniques illustrated in connection with FIG. 9. In this example, an application of the mobile device 900 displays text content which, for the purpose of illustration, may be text content of a short message service (SMS) conversation, although different types of textual displays are considered as being within the scope of the present disclosure.

To avoid legible screenshots, the application controlling the display 902 of the mobile device 900 may display the textual content as a series of frames 908, each frame containing a portion of the textual content. In the illustrated example, every fourth character of the textual content is displayed while the remaining three of four are hidden. However, which characters are shown changes over time rapidly enough so that, to the perspective of a human user, a legible message appears on the display 902 of the mobile device 900. It should also be understood that each individual character could be split into multiple pieces, pixels, or groups of pixels as the same technique applied.

As an illustrative example, the characters of a textual message may be enumerated (i.e., assigned corresponding positive integer values from one to the number of characters). Using modular arithmetic, a first display (or frame) may show the characters with assigned integers whose values modulo four equal one (i.e., one, five, nine, etc.). A second display (or frame) may show the characters with assigned integers whose values modulo four equal two (i.e., two, six, ten, etc.). A third display (or frame) may show the characters with assigned integers whose values modulo four equal three (i.e., three, seven, eleven, etc.). A fourth display (or frame) may show the characters with assigned integers whose values modulo four equal zero (i.e., four, eight, twelve, etc.). An application of the mobile device 900 may cause the display to repeatedly show the first through fourth displays in order, cycling through the displays rapidly enough so that a human user is able to read the textual message.

As illustrated in FIG. 9, because one of the four displays is shown on the display 902 of the mobile device 900 at any given time, when a screenshot 904 is taken, the screenshot only contains 906 the characters assigned an integer equivalent to a particular integer modulo four. As a result, the screenshot contains a message that has a majority of the characters missing and, as a result, is effectively illegible to a human user as described herein. It should be noted that while the use of modular arithmetic for the purpose of determining which characters are shown on a display at a given time (or for the purpose of determining which pixels of an image are clearly shown on a display at a given time), such techniques are extendible to non-textual displays or displays that contain both text and other content (e.g., images). For example, the techniques may be used to determine which pixels or blocks of pixels appear on a display at any given time. Further, while arithmetic modulo four is used for illustration, different moduli, such as two, three, or more than four, may be used in different embodiments. Further, an application employing the techniques of the present disclosure may modify the modulus used based at least in part on device capabilities (e.g., screen refresh rate) and/or user-defined settings.

Figure 10:
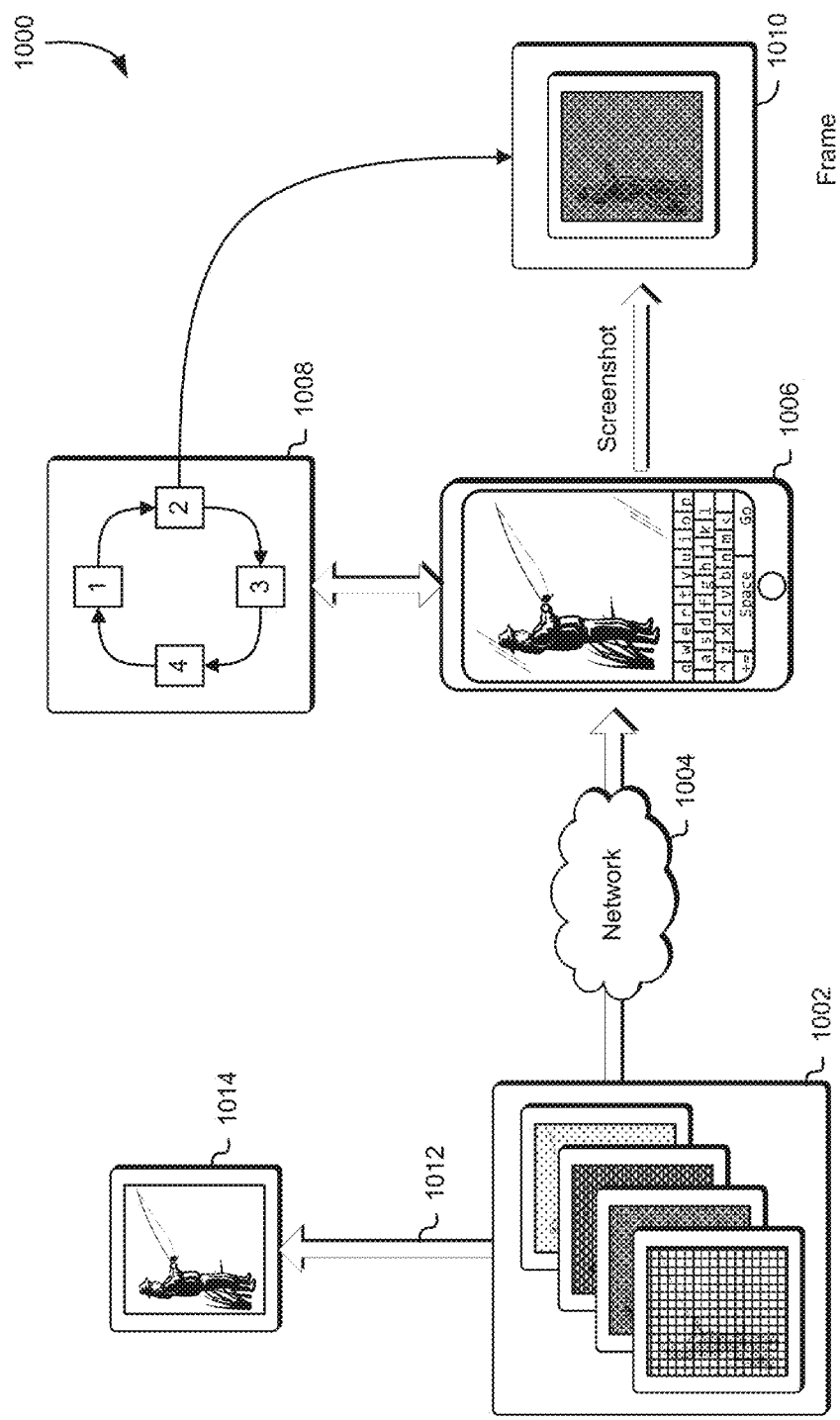
FIG. 10 illustrates an example environment where degraded frames may be reconstructed in accordance with an embodiment.

FIG. 10 illustrates an example environment 1000 where multiple degraded frames may be reconstructed using a system for degrading displayed image frames as described herein in connection with FIG. 1 and in accordance with an embodiment. In the example illustrated in FIG. 10, one or more degraded frames 1002 may be generated by a process such as the process 300 and/or the process 700 described herein. The one or more degraded frames 1002 may be generated by another user of the application on a computing device, or on a server, or on one or more of a collection of virtual machines hosted by a resource provider, or by some other such method. In an embodiment, the one or more degraded frames 1002 may be transmitted to a computing device 1006 over a network 1004 as described herein. The computing device 1006 may be configured to display the one or more degraded frames as cyclic images 1008 as described herein so that, a screenshot taken of the device may display a single degraded frame 1010 of the cyclic images 1008.

In an embodiment, the one or more degraded frames 1002 may also be descrambled 1012 to reproduce a non-degraded image 1014. For example, degraded frames may be descrambled 1012 by determining clear portions (or non-degraded portions) of each of the degraded frames 1002 and combining those clear portions into a non-degraded image 1014. Clear portions of the degraded frames may be detected by applying one or more image processing techniques to the degraded frames 1002, by using metadata associated with the degraded frames 1002, by joining the pixels in the degraded frames 1002, by performing a weighted join of the pixels in the one or more degraded frames 1002, or by performing a combination of these and/or other such operations. In an embodiment for degrading text content, the degraded frames may be combined using a union operation (or other combining or additive operation) to produce the non-degraded image 1014. In some embodiments, the one or more degraded frames 1002 may be descrambled 1012 to produce a non-degraded image 1014 based on a subset of the degraded frames 1002. For example, techniques such as those described herein may be used to produce a non-degraded image 1014 based on only some of the degraded frames 1002 if, for example, only some of the degraded frames 1002 are available. As may be contemplated, the methods of descrambling degraded frames to produce a non-degraded image described herein are merely illustrative examples and other such methods of descrambling degraded frames to produce a non-degraded image may be considered as within the scope of the present disclosure.

Figure 11:
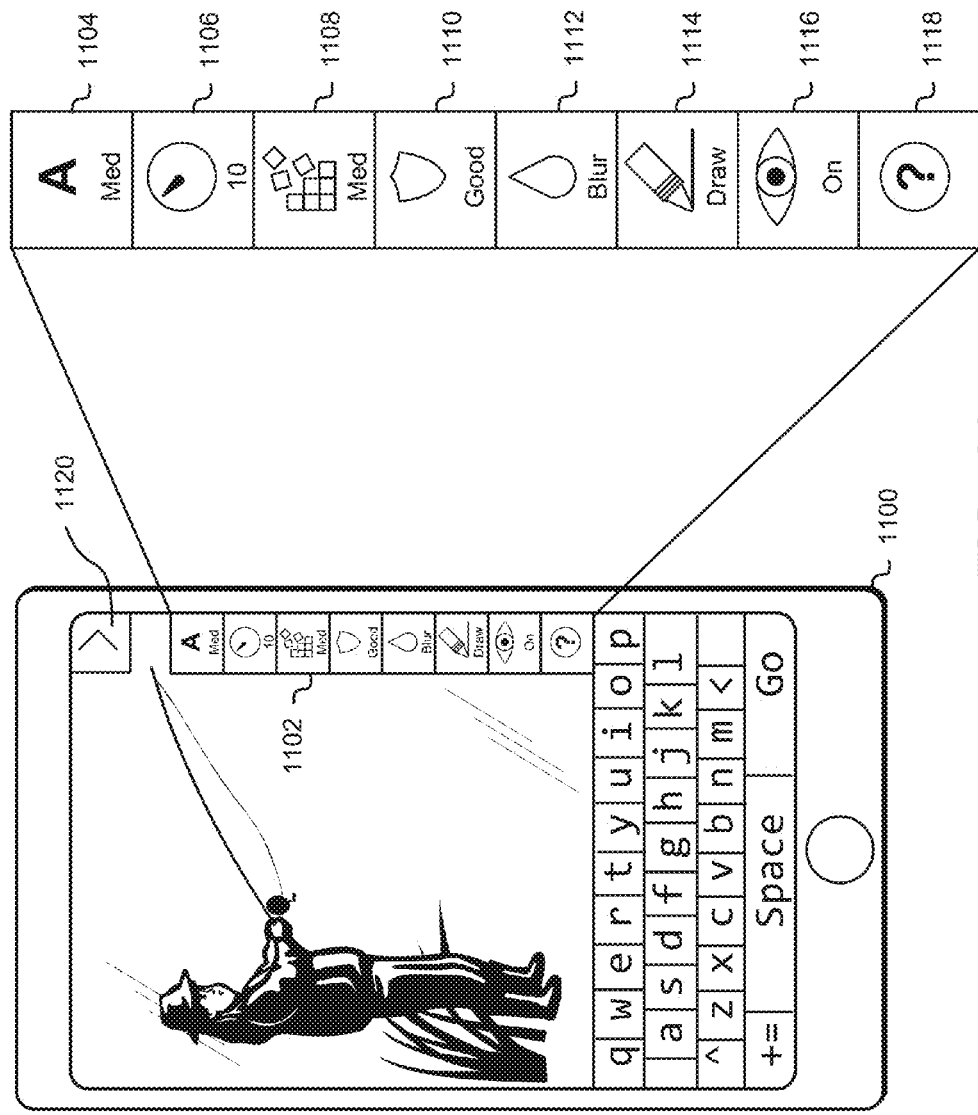
FIG. 11 illustrates an example user interface for selecting degradation parameters in accordance with an embodiment.

FIG. 11 illustrates an example user interface 1100 for selecting degradation parameters for degrading data frames using a system for degrading displayed image frames as described in connection with FIG. 1 and in accordance with an embodiment. A user may use a computing device (such as the computing device 104 described herein in connection with FIG. 1) to take a picture and may then enter an edit mode wherein the example user interface 1100 may be used to edit degradation parameters that may be used to create the degraded frames. In the example user interface 1100 described in connection with FIG. 11, a set of icons 1102 may displayed on the display of the computing device. Each icon of the set of icons 1102 may be selected by the user by, for example, touching the display region associated with the icon using a finger or a stylus, scrolling to the icon using a scrolling function associated with the computing device, or some other such method of selecting the icon. Each icon of the set of icons 1102 may have a menu of additional icons which may be selected so that, for example, selecting an icon for the quality of the degradation (i.e., how degraded the images will be) may have options for "good", "better", and "best." The menu associated with each icon of the set of icons 1102 may be a drop down (i.e., may expand below the icon), may be an expansion (i.e., may expand to the side of the icon), may be a pop-up (i.e., may open a new display element, may be a scroll region (i.e., may allow "flipping through" the additional icons), or may be a combination of these and/or other such display modalities.

In the example user interface 1100 illustrated in FIG. 11, the icons may include, but may not be limited to, the icons described herein. For example, an icon that allows the user to change the size of the text 1104 may be presented to allow the user to alter the text size for content that may include text. In an embodiment, the application described herein may allow the user to add text elements to an image. In such an embodiment, the user may use the icon that allows the user to change the size of the text 1104 to change the text size of the text that is added to the image.

An icon that allows the user to set the amount of time that a series of degraded images are displayed 1106 may also be presented. As described herein, an image may only be displayed for a certain amount a time when received by a user. The icon that allows the user to set the amount of time that a series of degraded images are displayed 1106 may allow the user to increase the security of an image that is sent to another user. An image that is displayed for thirty seconds may be less secure (i.e., more vulnerable to being compromised) than an image that is displayed for only one second. In an embodiment, a user may also be able to determine how long an image is retained on a server and/or in a database using the icon that allows the user to set the amount of time that a series of degraded images are displayed 1106. For example, a user may determine that an image may only remain available for viewing for a minute, or an hour, or a day, or a week, or a month, or for some other such time period.

An icon that allows a user to change the sizes of the regions used in the degradation 1108 may also be presented. Larger regions may present larger areas of content that are not obscured in a screenshot, thus making the individual degradation frames less secure. Smaller regions may present smaller areas of content that are not obscured in the screenshot, thus making the individual degradation frames more secure.

An icon that allows a user to set the quality of the degradation 1110 may also be presented. The icon that allows a user to set the quality of the degradation 1110 may include options that, for example, increase the number of degradation frames that may be used to degrade the content (i.e., the image and/or the text). For example, a "good" quality degradation may use two degradation frames, a "better" quality degradation may user four degradation frames, and a "best" quality degradation may use eight degradation frames. A "better" quality degradation with, for example, four degradation frames, may have 75% of each degradation frame obscured.

An icon that allows a user to obscure different regions of the display 1112 may also be presented. Such an icon may also allow a user to prevent different regions of the display from being obscured. For example, in selecting the icon that allows a user to obscure different regions of the display 1112 (e.g., the obscured image elements), a user may be presented with functionality to select a screen region and to permanently obscure that region or image element using, for example, subsampling as described herein. Similarly, a user may select a screen region and mark that region to never be obscured (i.e., always be clearly displayed). Such unobscured image elements may also be partially obscured (i.e., they may be displayed clearly in some of the frames and obscured in some of the frames). Similarly, a user may select a screen region and mark that region to be obscured or to be degraded (e.g., using the degradation parameters described herein). In some embodiments, the regions that are selected to always be obscured and/or the regions that are selected to never be obscured may be selected based at least in part on the content of the image. For example, the system described herein may be configured to automatically detect image elements (e.g., faces, phone numbers, profanity, place names, street names, and so on) and always obscure those image elements. In some embodiments, regions outside of the region selected to be obscured or unobscured may be unobscured, may be obscured, or may be degraded using one or more of the degradation techniques described herein.

An icon that allows a user to draw on different regions of the display 1114 may also be presented. A user may draw on the different regions of the display to add detail, obscure detail, highlight regions, or other such functionality. Other icons may be presented such as, for example, an icon to toggle the degradation process and/or to alter the degradation cycle rate 1116 and/or an icon to display a help menu 1118. Such other icons may be associated with degradation parameters, degradation modes, the functioning of the application, or other such functionality.

Once a user is satisfied with the degradation of the content, the user may then send the degraded content to a recipient using an icon to send the content 1120. Selecting the icon to send the content 1120 may present an additional user interface that may allow a user to select a user to receive the degraded content, add a clear message to the content, or other such functionality.

Figure 12:
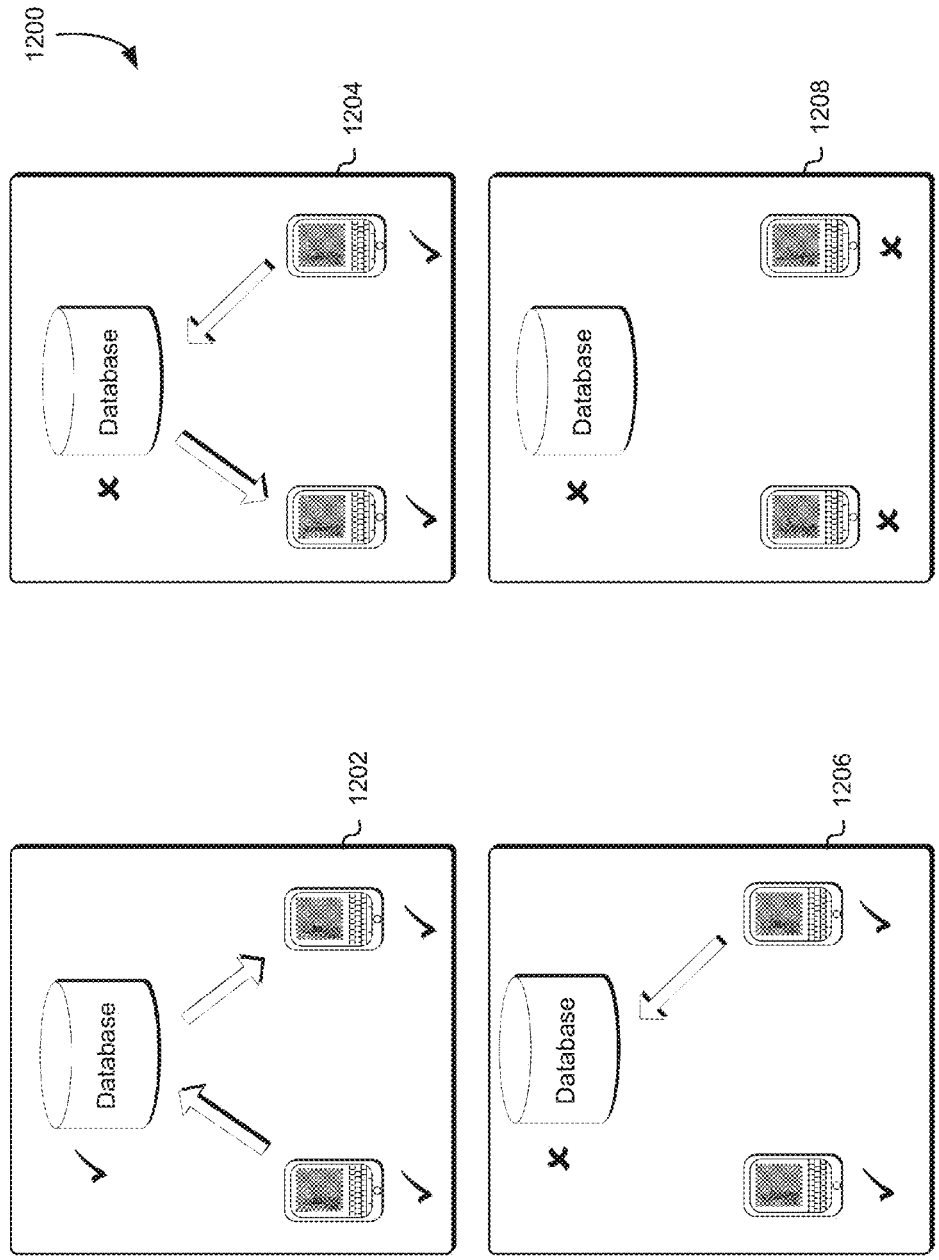
FIG. 12 illustrates an example environment where messages may be communicated between multiple devices in accordance with an embodiment.

FIG. 12 illustrates an example environment where messages may be communicated between multiple devices as described in connection with FIG. 1 and in accordance with an environment. When a user first sends a message with degraded content to a recipient 1202, the degraded content may be sent to a database and a notification of the message may also be sent to a computing device of the recipient. The user may attempt to view the message associated with the notification and, if the message is still valid (i.e., has not expired or been recalled), then the message content with the degradation frames may be sent to the user. When the user views the message 1204, a notification may be sent back to the database to delete the message content from the database. A notification may also be sent back to the sender, notifying the sender that the message has been viewed. In an embodiment, the message may be deleted after a set amount of time after viewing. In an embodiment, the message may be deleted even if not viewed within a specified amount of time. Deleting a message (i.e., on the sending device, in the database, and/or on the receiving device) may be performed in various ways in accordance with various embodiments. For example, deleting a message may be performed by making memory allocated to the message available for use by the same and/or another application so that, with operation of the device, the memory will likely eventually be overwritten by different data. In other embodiments, the memory allocated to the message may be overwritten one or more times with random or non-random (e.g., a series of zeroes) data to ensure that the message is irrecoverable from memory, even using advanced techniques.

In some embodiments, the message is encrypted in memory of the device so as to be decryptable with a cryptographic key. Deletion of the message may be effectively performed by deletion (e.g., reallocation of memory and/or overwriting of memory in which the cryptographic key is stored) of the cryptographic key. For instance, the cryptographic key may be overwritten in memory and memory allocated to the message may be deallocated (i.e., made available for other use). As mentioned herein, the memory associated with the message may first be overwritten one or more times before being deallocated.

If degraded content associated with a message has been removed 1206 from database, a receiver that attempts to view the degraded content associated with the message may be informed that the message is no longer available, has been removed, has been recalled, or provided with other such information with respect to the message. In an embodiment, the sender may receive a notification that the receiver has attempted to view degraded content that is no longer available. In an embodiment, when degraded content is removed from the database 1208, the message, the degraded content, and the notification may all be removed from the associated devices. In another embodiment, the sender may retain the message until the user takes an action to remove the message from the associated device. A user may remove portions of messages, individual messages, sets of messages, or all messages stored on the device. In some embodiments, all record of the message may be expunged upon removal. In some embodiments, only a record of the message (i.e., with all content and identifying metadata removed) may be retained on the database after the message is removed. The record of the message may be retained to allow computation of statistical data of database efficiency, message throughput, message volume, or for other such reasons. In an embodiment, a sender may send a message to a receiver with a device that is not configured to display the degraded content. In such an embodiment, the receiver may access the degraded content using a web service configured to display the degraded content.

Messages, degradation content, notifications, responses, and/or requests (collectively referred to herein as "messages") may be encrypted before being stored. Messages, degradation content, notifications, responses, and/or requests may be encrypted before being sent to databases and/or other devices. For example, messages may be sent using hypertext transport secure protocol. Encryption of messages before storage and/or before sending may be accomplished using a certificate, using a symmetric key exchange, using public and private key pairs, using custom algorithms, or using other such encryption techniques. A message may be encrypted by the sender, encrypted again for transport to the database, stored with encryption in the database, forwarded to the receiver using encryption, and decrypted at the receiver.

The encryption of a message, and thus the security of the message, may be increased when a malicious attacker attempts to defeat the security of the message. For example, a malicious attacker may take a video of a degraded image and use the frames from the video to reconstruct the content. A malicious attacker may also take multiple screenshots of the display in an attempt to use the multiple screenshots to reconstruct the image. A malicious attacker may also detect unobscured regions in degraded image and attempt to combine those unobscured regions. With text content, a malicious attacker may simply combine the obscured text to produce an intelligible version of the content.

Other methods of increasing message security in response to a malicious attacker attempting to defeat the security of the message may also be performed. For example, a front-facing camera may be used to ensure there is a face in front of the device (i.e., to ensure a person is reading the message and it is not, for example, a person holding a camera). A front-facing camera may be used with shape recognition software may be used to detect a camera, a phone, the logo of a device manufacturer, or some other such non-human feature. In an embodiment, the front-facing camera may be with facial recognition software to ensure that the person reading the message is the person who should be reading the message using, for example, a database of faces of known message receivers. In some embodiments, the system described herein may use device API calls to detect the applications running on the device and/or to not allow a message to be viewed if certain designated applications (i.e., a screen capture application) are running. In such embodiments, a list of allowed and/or disallowed applications may be sent to the receiver device on a periodic basis.

Figure 13:
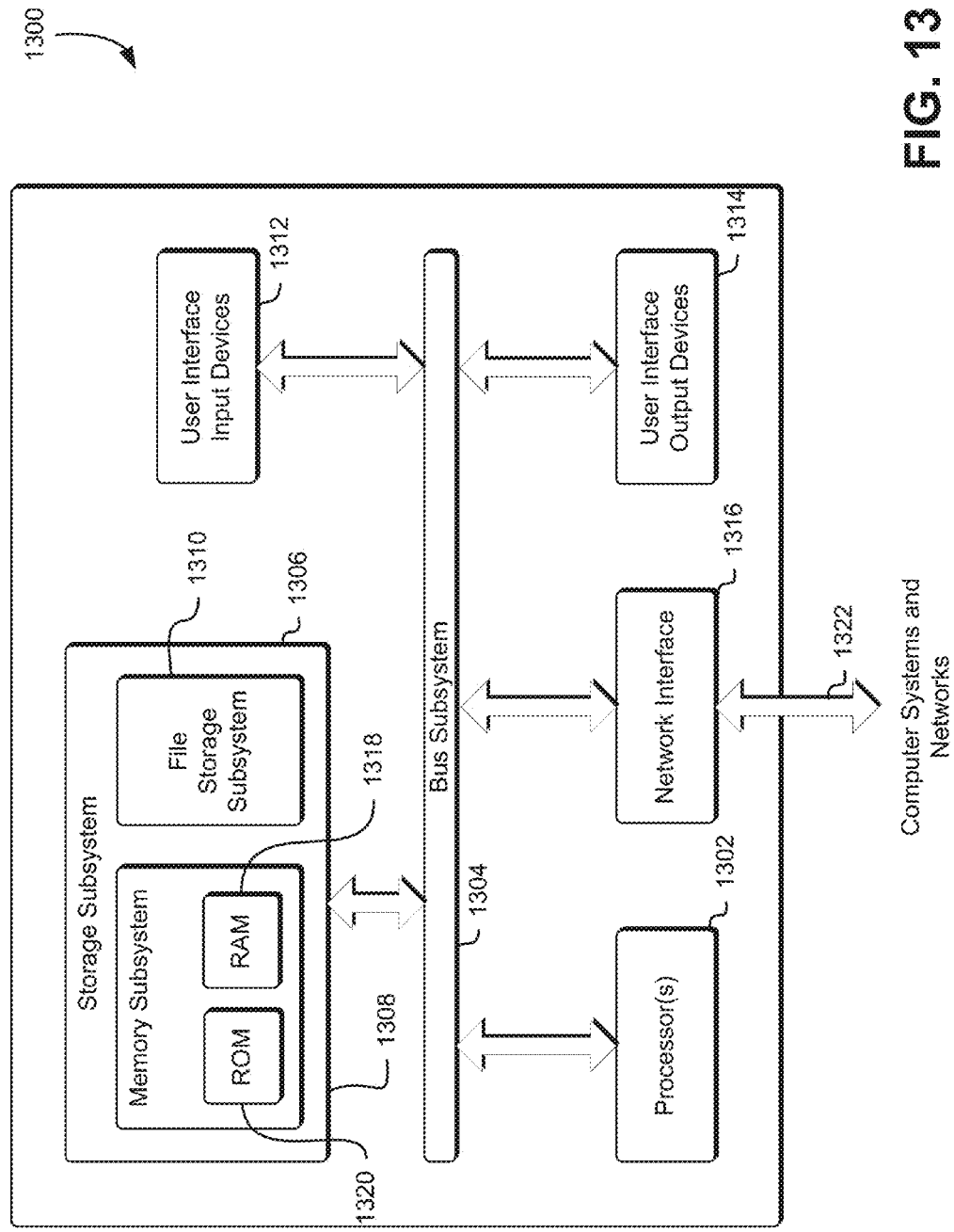
FIG. 13 illustrates an environment in which various embodiments can be implemented.

FIG. 13 is a simplified block diagram of a computer system 1300 that may be used to practice an embodiment of the present invention. In various embodiments, one or more instances of the computer system 1300 may be used to implement any of the systems illustrated and described above. For example, one or more instances of the computer system 1300 may be used to implement processes for degrading image and/or text displays according to the present disclosure. As shown in FIG. 13, the computer system 1300 may include one or more processors 1302 that may be configured to communicate with and are operatively coupled to a number of peripheral subsystems via a bus subsystem 1304. These peripheral subsystems may include a storage subsystem 1306, comprising a memory subsystem 1308 and a file storage subsystem 1310, one or more user interface input devices 1312, user interface output devices 1314, and a network interface subsystem 1316.

The bus subsystem 1304 may provide a mechanism for enabling the various components and subsystems of computer system 1300 to communicate with each other as intended. Although the bus subsystem 1304 is shown schematically as a single bus, alternative embodiments of the bus subsystem may utilize multiple busses.

The network interface subsystem 1316 may provide an interface 1322 to other computer systems and networks. The network interface subsystem 1316 may serve as an interface for receiving data from and transmitting data to other systems from the computer system 1300. For example, the network interface subsystem 1316 may enable a user computer system device to connect to the computer system 1300 via the Internet and/or other network, such as a mobile network, and facilitate communications using the network(s) and to send and/or receive degraded frames.

The user interface input devices 1312 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. Further, in some embodiments, input devices may include devices usable to obtain information from other devices. Input devices may include, for instance, magnetic or other card readers, one or more USB interfaces, near field communications (NFC) devices/interfaces and other devices/interfaces usable to obtain data (e.g., degraded frames) from other devices. In general, use of the term "input device" is intended to include all possible types of devices and mechanisms for inputting information to the computer system 1300.

The user interface output devices 1314 may include a display subsystem, a printer, non-visual displays (e.g., audio and/or tactile output devices), or other such display devices. Generally, the output devices 1314 may invoke one or more of any of the five senses of a user. For example, the display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the computer system 1300. The user interface output devices 1314 may be used, for example, to generate and/or present user interfaces to facilitate user interaction with applications performing processes described herein and variations therein, when such interaction may be appropriate. While a computer system 1300 with user interface output devices is used for the purpose of illustration, it should be noted that the computer system 1300 may operate without an output device, such as when the computer system 1300 is operated in a server rack and, during typical operation, an output device is not needed.

The storage subsystem 1306 may provide a computer-readable storage medium for storing the programming and data constructs that provide the functionality of the present invention. Software (programs, code modules, instructions) that, when executed by one or more processors 1302, may provide the functionality of the present invention, may be stored in storage subsystem 1306. The storage subsystem 1306 may also provide a repository for storing data used in accordance with the present invention. The storage subsystem 1306 may comprise memory subsystem 1308 and disk or file storage subsystem 1310. The storage subsystem may include database storage, file storage and/or other storage functionality.

The memory subsystem 1308 may include a number of memory devices including, for example, random access memory (RAM) 1318 for storage of instructions and data during program execution and read-only memory (ROM) 1320 in which fixed instructions may be stored. The file storage subsystem 1310 may provide a non-transitory persistent (non-volatile) storage for program and data files, and may include a hard disk drive, a floppy disk drive along with associated removable media, a compact disk read-only memory (CD-ROM) drive, a digital versatile disk (DVD), an optical drive, removable media cartridges, and other like storage media.

The computer system 1300 may be of various types including a personal computer, a portable computer, a workstation, a network computer, a mainframe, a kiosk, a server, or any other data processing system. Due to the ever-changing nature of computers and networks, the description of computer system 1300 depicted in FIG. 13 is intended only as a specific example for purposes of illustrating the preferred embodiment of the computer system. Many other configurations having more or fewer components than the system depicted in FIG. 13 are possible.

The various embodiments further can be implemented in a wide variety of operating environments, which in some cases can include one or more user computers, computing devices or processing devices which can be used to operate any of a number of applications. User or client devices may include any of a number of general purpose personal computers, such as desktop, laptop or tablet computers running a standard operating system, as well as cellular, wireless and handheld devices running mobile software and capable of supporting a number of networking and messaging protocols. Such a system may also include a number of workstations running any of a variety of commercially-available operating systems and other known applications for purposes such as development and database management. These devices may also include other electronic devices, such as dummy terminals, thin-clients, gaming systems and other devices capable of communicating via a network. These devices may also include virtual devices such as virtual machines, hypervisors and other virtual devices capable of communicating via a network.

The various embodiments of the present disclosure may utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, or any combination thereof.

In embodiments utilizing a web server, the web server may run any of a variety of server or mid-tier applications, including Hypertext Transfer Protocol ("HTTP") servers, Hypertext Transfer Protocol Secure ("HTTPS") servers, Transport Layer Security ("TLS") servers, File Transfer Protocol ("FTP") servers, Common Gateway Interface ("CGI") servers, data servers, Java servers, Apache servers, Internet Information Services ("IIS") servers, proxy servers (e.g., F5®, Squid, etc.), business application servers, and/or other such servers. The server(s) may also be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python®, JavaScript®, or TCL, as well as combinations thereof. The server(s) may also include database servers, including without limitation those commercially available from Oracle®, Microsoft®, Sybase®, and IBM® as well as open-source servers such as MySQL, Postgres, SQLite, NoSQL, PLIST, Hadoop, MongoDB, or other servers capable of storing, retrieving, and accessing structured or unstructured data. Database servers may include table-based servers, document-based servers, unstructured servers, relational servers, non-relational servers or combinations of these and/or other database servers.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such storage devices may also include a computer-readable storage media reader, a communications device (e.g., a modem, a network card (wireless or wired), or an infrared communication device), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory (referred to herein as a "non-transitory computer-readable storage medium"), may be tangible (referred to herein as a "tangible computer-readable storage medium"), or may be both tangible and non-transitory (referred to herein as a "tangible non-transitory computer-readable storage medium").

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   determining a set of degradation parameters based at least in part on content configured for displaying on a display;
   calculating, based at least in part on a first subset of the set of degradation parameters, a number of degradation frames;
   generating the number of degradation frames to obtain a set of degradation frames comprising multiple degradation frames such that each degradation frame of the set of degradation frames at least comprises degradation frame content, the degradation frame content at least including non-degraded content corresponding to at least a part of the content, the degradation frame content further at least including degraded content based at least in part on a second subset of the set of degradation parameters;
   determining a frame display order based at least in part on a third subset of the set of degradation parameters; and
   providing, to one or more computing devices, one or more degradation frames selected from the set of degradation frames in an order corresponding to the frame display order.

2. The computer-implemented method of claim 1, wherein the content includes image content.

3. The computer-implemented method of claim 1, wherein the content includes text content.

4. The computer-implemented method of claim 1, wherein the one or more degradation frames are further selected from the set of degradation frames based at least in part on one or more psychophysical properties of vision.

5. The computer-implemented method of claim 1, wherein the frame display order includes at least one of: sequential order, random order, stochastic order, an order based on psychophysics, or an acyclic order.

6. The computer-implemented method of claim 1, further comprising:
   selecting, from each degradation frame of the one or more degradation frames selected from the set of degradation frames, at least a art of the non-degraded content based at least in part on one or more properties associated with each degradation frame of the one or more degradation frames selected from the set of degradation frames;
   adding the at least the part of the non-degraded content to a set of non-degraded content; and
   creating a non-degraded image based at least in part on the set of non-degraded content.

7. A system, comprising:
at least one computing device configured to implement one or more services, wherein the one or more services are configured to:
generate a set of degradation frames that comprises multiple degradation frames, each degradation frame of the set of degradation frames based at least in part on a source frame, each degradation frame of the set of degradation frames generated from the source frame using a set of degradation parameters;
determine a frame display order; and
display at least a subset of the set of degradation frames in an order corresponding to the frame display order, the at least a subset of the set of degradation frames selected from the set of degradation frames based at least in part on a set of non-degraded content associated with the degradation frame.

8. The system of claim 7, wherein the set of degradation parameters is based at least in part on the source frame.

9. The system of claim 7, wherein the set of degradation parameters is based at least in part on one or more psychophysical properties of vision.

10. The system of claim 7, wherein the frame display order is acyclic.

11. The system of claim 7, wherein the set of degradation parameters at least comprises:
a first subset of degradation parameters configured to cause the one or more services to generate a first one of more portions of the degradation frame by copying data from one or more portions of the source frame corresponding to the first one or more portions of the degradation frame; and
a second subset of degradation parameters configured to cause the one or more services to generate a second one or more portions of the degradation frame by altering data from one or more portions of the source frame corresponding to the second one or more portions of the degradation frame.

12. The system of claim 7, wherein each frame of the set of degradation frames at least includes a subset of the source frame; and a set of subsets of the source frame included in the set of degradation frames at least comprises the source frame.

13. The system of claim 7, wherein the set of non-degraded content associated with the degradation frame is generated from the source frame based at least in part on a randomly selected portion of the source frame.

14. A non-transitory computer-readable storage medium having code stored thereon that, when executed by a computer, causes the computer to perform operations including:
determine a set of degradation parameters based at least in part on a source frame;
generate a set of degradation frames that comprises multiple degradation frames, each degradation frame of the set of degradation frames at least comprising a set of non-degraded data based at least in part on the source frame, each degradation frame of the set of degradation frames at least comprising a set of degraded data based at least in part on the set of degradation parameters;
determine a frame display order based at least in part on the set of degradation parameters; and
provide one or more degradation frames selected from the set of degradation frames in an order corresponding to the frame display order, the one or more degradation frames selected from the set of degradation frames based at least in part on the set of non-degraded data.

15. The non-transitory computer-readable storage medium of claim 14,
wherein the set of degradation parameters is based at least in part on persistence of vision.

16. The non-transitory computer-readable storage medium of claim 14,
wherein the source frame includes one or more text elements.

17. The non-transitory computer-readable storage medium of claim 16,
wherein the set of degraded data for each degradation frame is generated from the source frame by removing a first set of characters from the source frame from each degradation frame, the characters of the first set of characters selected from each of the one or more text elements based at least in part on a requirement that a second set of characters at least comprises the source frame, each character in the second set of characters comprising characters not contained in at least one set of degraded data.

18. The non-transitory computer-readable storage medium of claim 17,
wherein the first set of characters is selected randomly.

19. The non-transitory computer-readable storage medium of claim 16,
wherein instructions that, when executed, cause the computer to generate the set of degraded data, further include instructions that, when executed, cause the computer to at least:
select a set of characters from the source frame;
obtain an image representation of each character of a subset of the set of characters; and
degrade the image representation to produce a degraded image representation of each character of the subset of the set of characters based at least in part on the set of degradation parameters.

20. The non-transitory computer-readable storage medium of claim 16,
wherein instructions that, when executed, cause the computer to generate the set of degraded data, further include instructions that, when executed, cause the computer to at least:
generate an image representation of one or more of the one or more text elements; and
create the set of degraded data from the image representation based at least in part on the set of degradation parameters.

21. The non-transitory computer-readable storage medium of claim 16, wherein instructions that, when executed, cause the computer to generate the set of degraded data, further include instructions that, when executed, cause the computer to at least:
select, for each character of a set of characters, a set of portions of the character; and
remove one or more portions of the set of portions of the character based at least in part on the set of degradation parameters.

22. The non-transitory computer-readable storage medium of claim 14,
wherein the source frame comprises one or more image elements.

23. The non-transitory computer-readable storage medium of claim 22,
wherein the set of degradation data for each degradation frame is generated from the source frame by removing random image elements from the one or more image elements.

24. The non-transitory computer-readable storage medium of claim 22,
  wherein the one or more image elements further comprises one or more unobscured image elements that are included in the set of non-degraded data of a plurality of the degradation frames of the set of degradation frames.

25. The non-transitory computer-readable storage medium of claim 22,
  wherein the one or more image elements further comprises one or more obscured image elements that are included in the set of degraded data of a plurality of the degradation frames of the set of degradation frames.

26. The non-transitory computer-readable storage medium of claim 25,
  wherein the one or more obscured image elements are selected based at least in part on the source frame.

* * * * *